(12) United States Patent
Park et al.

(10) Patent No.: US 12,065,515 B2
(45) Date of Patent: Aug. 20, 2024

(54) POLYPROPYLENE-BASED COMPOSITE MATERIAL AND METHOD FOR PREPARING THE SAME

(71) Applicant: LG Chem, Ltd., Seoul (KR)

(72) Inventors: Sang Eun Park, Daejeon (KR); In Sung Park, Daejeon (KR); Eun Jung Lee, Daejeon (KR); Hyun Jin Ju, Daejeon (KR); Tae Su Kim, Daejeon (KR); Choong Hoon Lee, Daejeon (KR); Jin Sam Gong, Daejeon (KR); Jung Ho Jun, Daejeon (KR); Rae Keun Gwak, Daejeon (KR)

(73) Assignee: LG Chem, Ltd., Seoul (KR)

( * ) Notice: Subject to any disclaimer, the term of this patent is extended or adjusted under 35 U.S.C. 154(b) by 535 days.

(21) Appl. No.: 17/603,210

(22) PCT Filed: Aug. 27, 2020

(86) PCT No.: PCT/KR2020/011460
§ 371 (c)(1),
(2) Date: Oct. 12, 2021

(87) PCT Pub. No.: WO2021/040425
PCT Pub. Date: Mar. 4, 2021

(65) Prior Publication Data
US 2022/0185920 A1 Jun. 16, 2022

(30) Foreign Application Priority Data
Aug. 28, 2019 (KR) .................. 10-2019-0105772

(51) Int. Cl.
C08F 110/06 (2006.01)
C08F 4/6592 (2006.01)
C08L 23/08 (2006.01)

(52) U.S. Cl.
CPC .......... C08F 110/06 (2013.01); C08F 4/6592 (2013.01); C08L 23/0815 (2013.01); *C08L 2203/30* (2013.01); *C08L 2205/02* (2013.01)

(58) Field of Classification Search
None
See application file for complete search history.

(56) References Cited

U.S. PATENT DOCUMENTS

| 5,064,802 A | 11/1991 | Stevens et al. |
| 6,548,686 B2 | 4/2003 | Nabika et al. |

(Continued)

FOREIGN PATENT DOCUMENTS

| CN | 106661142 A | 5/2017 |
| EP | 3878875 A1 | 9/2021 |

(Continued)

OTHER PUBLICATIONS

Search report from International Application No. PCT/KR2020/011460, mailed Dec. 2, 2021.

(Continued)

*Primary Examiner* — Eli D. Strah
(74) *Attorney, Agent, or Firm* — Lerner David LLP

(57) ABSTRACT

The present invention relates to a polypropylene-based composite material having improved physical properties including impact strength at low temperature and at room temperature, flexural strength, flexural modulus, etc., and a method for preparing the same.

15 Claims, 2 Drawing Sheets

(56) References Cited

U.S. PATENT DOCUMENTS

| | | | |
|---|---|---|---|
| 9,670,346 B2 | 6/2017 | Itakura et al. | |
| 2007/0135623 A1 | 6/2007 | Voskoboynikov et al. | |
| 2016/0326281 A1 | 11/2016 | Kim et al. | |
| 2017/0081509 A1* | 3/2017 | Itakura | C08L 23/16 |
| 2017/0145122 A1 | 5/2017 | Kim et al. | |
| 2018/0223014 A1* | 8/2018 | Woo | C08L 23/00 |
| 2018/0371116 A1 | 12/2018 | Kim et al. | |
| 2020/0010657 A1* | 1/2020 | Kim | C08F 210/16 |
| 2021/0009793 A1 | 1/2021 | Lee et al. | |
| 2022/0049033 A1 | 2/2022 | Park et al. | |

FOREIGN PATENT DOCUMENTS

| | | |
|---|---|---|
| JP | H07090091 A | 4/1995 |
| JP | 2003183308 A | 7/2003 |
| JP | 4056368 B2 | 3/2008 |
| JP | 2017088893 A | 5/2017 |
| JP | 2018501186 A | 1/2018 |
| JP | 2022510678 A | 1/2022 |
| KR | 20160054849 A | 5/2016 |
| KR | 20160108586 A | 9/2016 |
| KR | 20170067642 A | 6/2017 |
| KR | 101815296 B1 | 1/2018 |
| KR | 20190064337 A | 6/2019 |
| KR | 20190076498 A | 7/2019 |
| KR | 20190076499 A | 7/2019 |
| KR | 20190078529 A | 7/2019 |
| KR | 102071594 B1 | 2/2020 |

OTHER PUBLICATIONS

Extended European Search Report including Written Opinion for Application No. 20857125.7 dated Jul. 26, 2022, pp. 1-6.

* cited by examiner

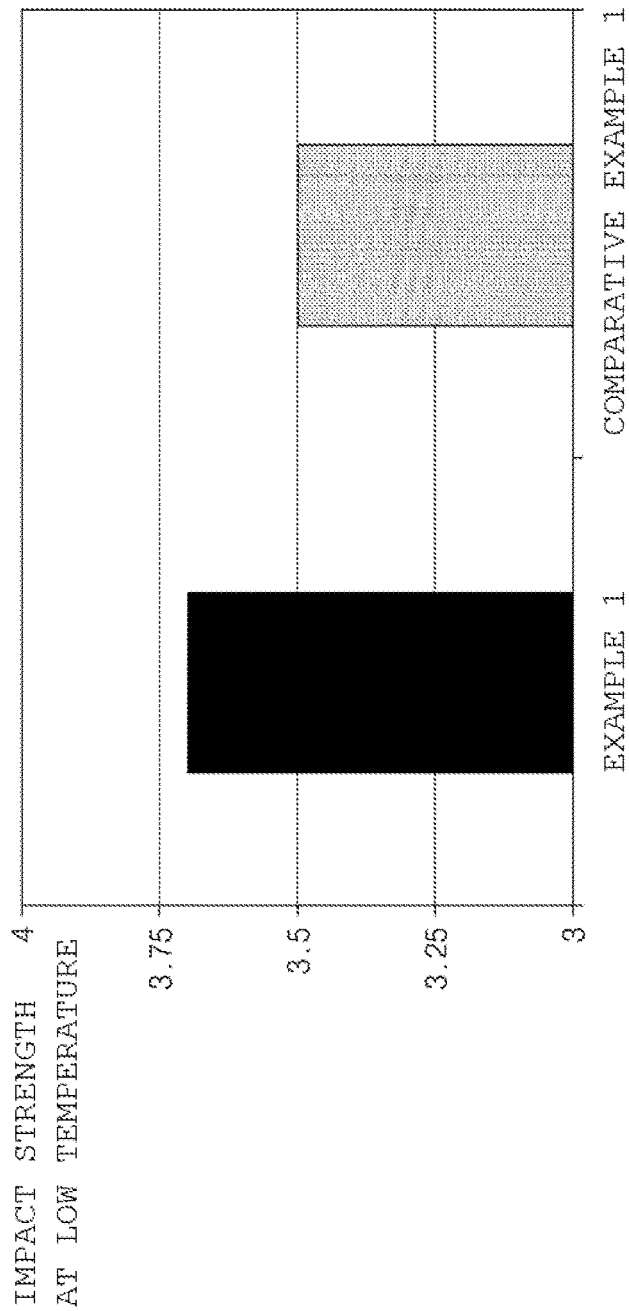
[FIG. 1]

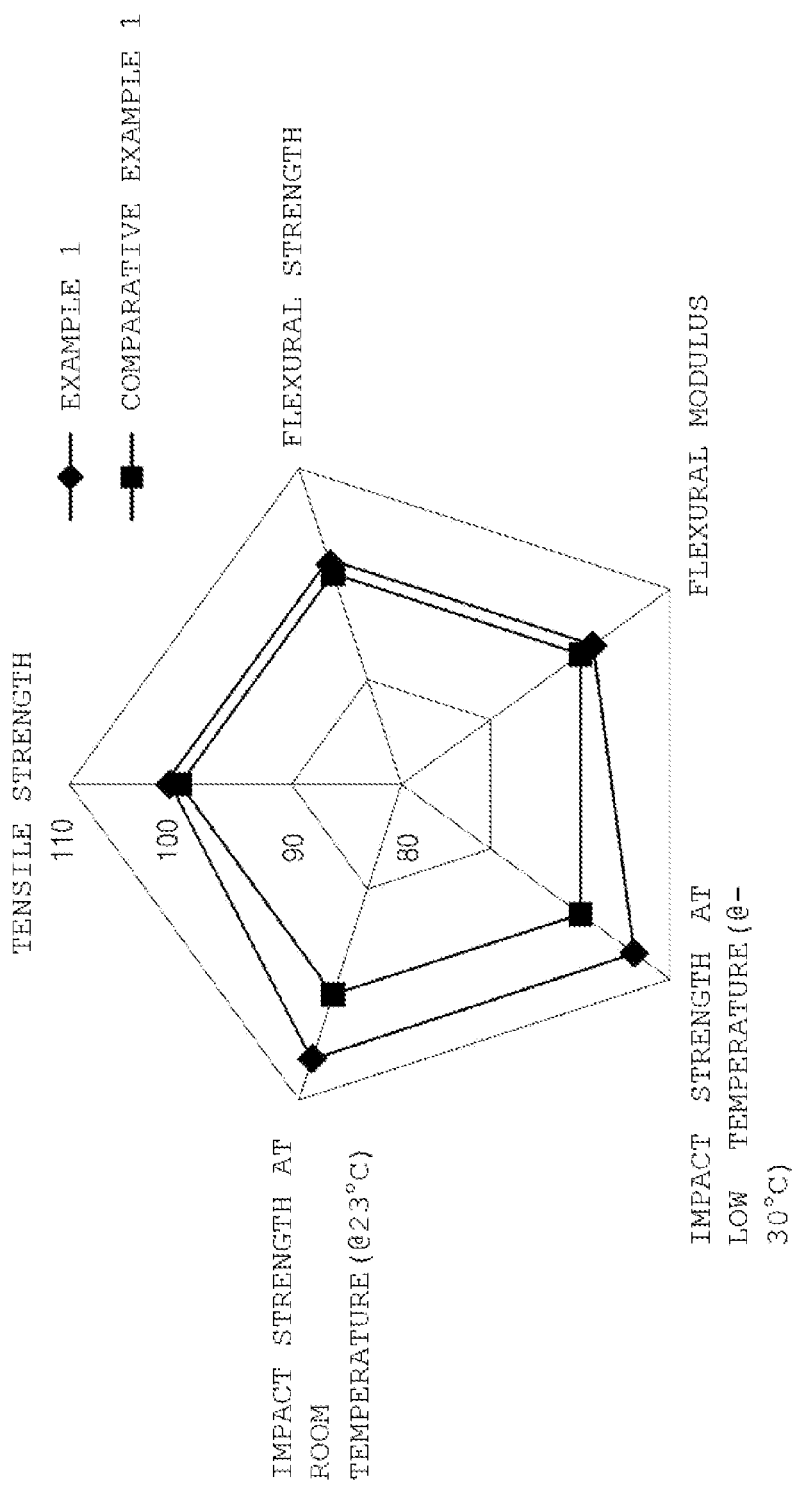
[FIG. 2]

POLYPROPYLENE-BASED COMPOSITE MATERIAL AND METHOD FOR PREPARING THE SAME

CROSS-REFERENCE TO RELATED APPLICATIONS

This application is a national phase entry under 35 U.S.C. § 371 of International Application No. PCT/KR2020/011460 filed Aug. 27, 2020, which claims priority from Korean Patent Application No. 10-2019-0105772, filed Aug. 28, 2019, all of which are incorporated herein by reference.

TECHNICAL FIELD

The present invention relates to a polypropylene-based composite material having improved physical properties such as impact strength at low temperature and room temperature, flexural strength, flexural modulus, etc., and a method for preparing the same.

BACKGROUND ART

Generally, as compositions for car interior and exterior material parts, polypropylene resin compositions including polypropylene (PP) as a main component, an impact reinforcing agent and an inorganic filler have been used.

Until the mid-1990s before developing ethylene/alpha-olefin copolymers polymerized by applying a metallocene catalyst, as car interior and exterior materials, particularly, as materials for a bumper cover, ethylene propylene rubber (EPR) or ethylene propylene diene rubber (EDPM) has been mainly used in most polypropylene-based resin compositions. However, after the appearance of ethylene/alpha-olefin copolymers synthesized by a metallocene catalyst, the ethylene/alpha-olefin copolymers have been used as impact reinforcing agents, and at present, become the mainstream. Because polypropylene-based composite materials using thereof have advantages in having well-balanced physical properties including impact strength, flexural modulus, flexural strength, etc., having good moldability and being cheap in price.

Since the molecular structure of polyolefin such as ethylene/alpha-olefin copolymers synthesized by a metallocene catalyst is more uniformly controlled than that by a Ziegler-Natta catalyst, molecular weight distribution is narrow, and mechanical properties are good overall. For a low-density ethylene elastomer synthesized by the metallocene catalyst, an alpha-olefin-based monomer is relatively uniformly inserted in a polyethylene molecule when compared with a Ziegler-Natta catalyst, and rubber properties of low-density may be maintained while showing excellent properties of mechanical properties.

However, the manufacture of even better products having balanced physical properties and processability according to diverse utilizing environments is consistently required.

PRIOR ART DOCUMENTS

Patent Documents (Patent Document 1) U.S. Pat. No. 5,064,802
(Patent Document 2) U.S. Pat. No. 6,548,686

DISCLOSURE OF THE INVENTION

Technical Problem

An object of the present invention is to provide a polypropylene-based composite material having excellent processability while showing excellent physical properties including impact strength at low temperature and at room temperature, flexural strength, flexural modulus, etc.

Another object of the present invention is to provide a method for preparing the polypropylene-based composite material.

Technical Solution

The present invention provides a polypropylene-based composite material including: polypropylene; and an olefin-based copolymer satisfying conditions (a) to (c) below.

(a) A melt index (MI, 190° C., 2.16 kg load conditions) is 10 to 100 g/10 min, (b) a soluble fraction (SF) at −20° C. measured by cross-fractionation chromatography (CFC) is 0.5 to 10 wt %, where a weight average molecular weight of the soluble fraction (Mw(SF)) is 22,000 or more, and (c) a value of Mw:Mw(SF), which is a ratio of a weight average molecular weight of the olefin-based copolymer (Mw) and the weight average molecular weight of the soluble fraction (Mw(SF)), is 0.9:1 to 2:1.

In addition, the present invention provides a method for preparing the polypropylene-based composite material of claim 1, including: (S1) a step of preparing polypropylene; (S2) a step of preparing an olefin-based copolymer by a method including polymerizing an olefin-based monomer by injecting hydrogen in 10 to 100 cc/min in the presence of a catalyst composition including a transition metal compound represented by the following Formula 1; and (S3) a step of melting and kneading the polypropylene and the olefin-based copolymer:

[Formula I]

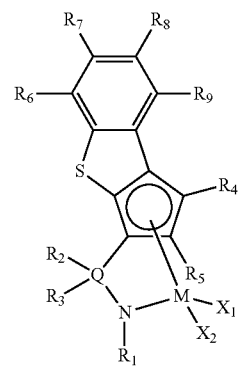

in Formula 1, $R_1$ is hydrogen; alkyl of 1 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_2$ and $R_3$ are each independently hydrogen; halogen; alkyl of 1 to 20 carbon atoms; alkenyl of 2 to 20 carbon atoms; arylalkyl of 7 to 20 carbon atoms; alkylamido of 1 to 20 carbon atoms; or arylamido of 6 to 20 carbon atoms, $R_4$ to $R_9$ are each independently hydrogen; silyl; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms, adjacent two or more among the $R_2$ to $R_9$ may be connected with each other to form a ring, Q is Si; C; N; P; or S, M is a transition metal in group 4, and $X_1$ and $X_2$ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

Advantageous Effects

The polypropylene-based composite material according to the present invention includes an olefin-based copolymer showing a higher weight average molecular weight value of a soluble fraction at a low temperature in a low-crystallinity region when compared with the conventional copolymer, and has markedly improved impact strength at low temperature and at room temperature while maintaining equivalent or better tensile strength, and accordingly, shows effects of excellent resistance against external impact.

BRIEF DESCRIPTION ON DRAWINGS

FIG. 1 is a graph showing the impact strength at low temperature of polypropylene-based composite materials according to an embodiment of the present invention and a comparative embodiment.

FIG. 2 is a graph showing the physical properties of polypropylene-based composite materials according to an embodiment of the present invention and a comparative embodiment.

BEST MODE FOR CARRYING OUT THE INVENTION

Hereinafter, the present invention will be described in more detail to assist the understanding of the present invention.

It will be understood that words or terms used in the present disclosure and claims shall not be interpreted as the meaning defined in commonly used dictionaries. It will be further understood that the words or terms should be interpreted as having a meaning that is consistent with their meaning in the context of the relevant art and the technical idea of the invention, based on the principle that an inventor may properly define the meaning of the words or terms to best explain the invention.

The term "polymer" used in the present invention means a polymer compound prepared by polymerizing monomers which are the same or different types. The common term, "polymer" includes a term, "interpolymer" as well as "homopolymer", "copolymer" and "terpolymer". The term "interpolymer" means a polymer prepared by polymerizing two or more different types of monomers. The common term "interpolymer" includes a term "copolymer" (commonly used to refer a polymer prepared from two different monomers) and a term "terpolymer" (commonly used to refer a polymer prepared from three different monomers). The term "interpolymer" includes a polymer prepared by polymerizing four or more types of monomers.

Hereinafter, the present invention will be explained in detail.

Polypropylene-Based Composite Material

Generally, polypropylene is used as car interior and exterior materials such as a car bumper, and to supplement the low impact strength of polypropylene, a polyolefin-based polymer is used together as an impact reinforcing material. Above all, in order to show properties of impact resistance, elastic modulus and tensile properties and to achieve high impact strength properties according to various usage environments, a low-density polyolefin-based polymer is used. However, in this case, there are problems of deteriorating the strength of polypropylene.

In this regard, in the present invention, an olefin-based copolymer which has increased hardness and high flowability, and may show improved physical properties of tensile strength, flexural strength, flexural modulus, etc. when compared with a copolymer having an equivalent degree of density is used for preparing a polypropylene-based composite material, and excellent mechanical strength and significantly improved impact strength properties may be shown without using a separate additive.

The polypropylene-based composite material of the present invention is characterized in including: polypropylene; and an olefin-based copolymer satisfying the conditions of (a) to (c) below.

(a) A melt index (MI, 190° C., 2.16 kg load conditions) is 10 to 100 g/10 min, (b) a soluble fraction (SF) at −20° C. measured by cross-fractionation chromatography (CFC) is 0.5 to 10 wt %, where a weight average molecular weight of the soluble fraction (Mw(SF)) is 22,000 or more, and (c) a value of Mw:Mw(SF), which is a ratio of a weight average molecular weight of the olefin-based copolymer (Mw) and the weight average molecular weight of the soluble fraction (Mw(SF)), is 0.9:1 to 2:1.

Polypropylene

In the polypropylene-based composite material of the present invention, the "polypropylene" may particularly be a homopolymer of polypropylene, or a copolymer of propylene and an alpha-olefin-based monomer, and in this case, the copolymer may be an alternating or random, or block copolymer. However, the polypropylene which may be overlapped with the olefin polymer is excluded, and the polypropylene is a different compound from the olefin polymer.

The alpha-olefin-based monomer may particularly be an aliphatic olefin of 2 to 12 carbon atoms, or 2 to 8 carbon atoms. More particularly, ethylene, propylene, 1-butene, 1-pentene, 3-methyl-1-butene, 1-hexene, 4-methyl-1-pentene, 3-methyl-1-pentene, 1-heptene, 1-octene, 1-decene, 1-undecene, 1-dodecene, 1-tetradecene, 1-hexadecene, 1-eicocene, 4,4-dimethyl-1-pentene, 4,4-diethyl-1-hexene, 3,4-dimethyl-1-hexene, etc., may be used, and any one among them or mixtures of two or more thereof may be used.

More particularly, the polypropylene may be any one selected from the group consisting of a polypropylene copolymer, a propylene-alpha-olefin copolymer, and a propylene-ethylene-alpha-olefin copolymer, or mixtures of two or more thereof, and in this case, the copolymer may be a random or block copolymer.

In addition, the melt index (MI) measured at 230° C. and a load of 2.16 kg of the polypropylene may be 0.5 g/10 min to 200 g/10 min, and particularly, the melt index (MI) may be 1 g/10 min to 150 g/10 min, more particularly, 10 g/10 min to 120 g/10 min. If the melt index of the polypropylene is deviated from the range, it is apprehended that defects may be generated during injection molding, but polypropylene having suitable melt index to a person skilled in the art may be used considering the types and amounts of materials mixed with the polypropylene-based composite material and the usage of the polypropylene-based composite material.

Particularly, in the polypropylene-based composite material according to an embodiment of the present invention, the polypropylene may be an impact copolymer having a melt index measured at 230° C. and a load of 2.16 kg of 0.5 g/10 min to 150 g/10 min, particularly, 1 g/10 min to 120 g/10 min, more particularly, a propylene-ethylene impact copolymer. The impact copolymer may be included in 30 wt % to 90 wt %, more particularly, 30 wt % to 80 wt % with respect to the total weight of the polypropylene-based composite material. In case of including the impact copolymer having such physical properties as polypropylene in the above-described amount range, particularly strength properties at low temperature may be improved.

The impact copolymer may be prepared so as to satisfy the above-described physical property conditions by using a general preparation reaction of a polymer, or may be obtained commercially. Particular examples may include Moplen CB5230 of DAELIM Industrial Co., Ltd., Moplen CB5290 of DAELIM Industrial Co., Ltd., SEETE™ M1600 of LG Chem, Co., etc.

In addition, in the polypropylene-based composite material of the present invention, the polypropylene may particularly be one or more random propylene copolymers having a DSC melting point in a range of 120° C. to 160° C., and a melting flow rate (MFR) measured at 230° C. and a load of 2.16 kg according to ASTM-D 1238 in a range of 5 g/10 min to 120 g/10 min, and the random propylene copolymer may be included in 30 wt % to 90 wt %, more particularly, 30 wt % to 80 wt % with respect to the total weight of the polypropylene-based composite material. If the polypropylene having such physical properties is included in the above-described amount range, the mechanical strength of the polypropylene-based composite material including hardness, etc. may be improved.

The random propylene copolymer may be prepared so as to satisfy the above-described physical property conditions by using the common preparation reaction of a polymer, or may be obtained commercially. Particular examples may include Braskem™ PP R7021-50RNA of Braskem America Inc., Formolene™ 7320A of Formosa Plastics Corporation in America, etc.

Olefin-Based Copolymer

In the polypropylene-based composite material of the present invention, the "olefin-based copolymer" satisfies the conditions of (a) to (c) below, particularly, satisfying conditions on a melt index, the amount and weight average molecular weight of a soluble fraction at −20° C., and a ratio of a weight average molecular weight of the olefin-based copolymer and the weight average molecular weight of the soluble fraction, at the same time.

(a) A melt index (MI, 190° C., 2.16 kg load conditions) is 10 to 100 g/10 min,
(b) a soluble fraction (SF) at −20° C. measured by cross-fractionation chromatography (CFC) is 0.5 to 10 wt %, where a weight average molecular weight of the soluble fraction (Mw(SF)) is 22,000 or more, and
(c) a value of Mw:Mw(SF), which is a ratio of a weight average molecular weight of the olefin-based copolymer (Mw) and the weight average molecular weight of the soluble fraction (Mw(SF)), is 0.9:1 to 2:1.

According to the condition (a), the melt index (MI, 190° C., 2.16 kg load conditions) of the olefin-based copolymer according to the present invention is 10 to 100 g/10 min.

The melt index (MI) may be controlled by controlling the amount used of a catalyst with respect to a comonomer in a process of polymerizing an olefin-based copolymer, and influences the mechanical properties, impact strength of the olefin-based copolymer, and moldability. The melt index is measured in low-density conditions, and measured under 190° C. and 2.16 kg load conditions according to ASTM D1238, and may be 10 to 100 g/10 min, particularly, 10 g/10 min or more, 11 g/10 min or more, 11.5 g/10 min or more, or 12 g/10 min or more, and 100 g/10 min or less, 50 g/10 min or less, 40 g/10 min or less, or 36 g/10 min or less.

If the melt index of the olefin-based copolymer is less than 10 g/10 min, the preparation of a polypropylene-based composite material using the same may be difficult, and the polypropylene-based composite material thus prepared may also show a low melt index, and accordingly, it would be unfavorable in view of processability, and application to various uses may become difficult.

According to the condition (b), the olefin-based copolymer according to the present invention has the soluble fraction (SF) at −20° C. measured by cross-fractionation chromatography (CFC) of 0.5 to 10 wt %, where a weight average molecular weight of the soluble fraction (Mw(SF)) is 22,000 or more.

The cross-fractionation chromatography (CFC) is a combined method of temperature rising elution fractionation (TREF) and gel filtration chromatography (GPC), and the crystallinity distribution and molecular weight distribution of the olefin-based copolymer may be found simultaneously.

Particularly, a specimen solution with a high temperature in which an olefin-based copolymer is completely dissolved in a solvent, is injected into a column filled with an inert carrier, and the temperature of the column is decreased so as to attach the specimen to the surface of a filler. Then, the temperature of the column is slowly increased while flowing o-dichlorobenzene in the column. The concentration of the olefin-based copolymer eluted at each temperature is detected, and at the same time, the component eluted at each temperature is sent fraction by fraction via on-line to GPC to obtain chromatogram, and from the chromatogram, the molecular weight distribution of each component is calculated.

In addition, since the elution temperature increases with the increase of the crystallinity of the eluted component, the crystallinity distribution of the olefin-based copolymer may be found by obtaining the relation of the elution temperature and the elution amount (wt %) of the olefin-based copolymer.

The olefin-based copolymer of the present invention may have a soluble fraction at −20° C. measured by CFC of 0.5 to 10 wt %, particularly, 0.5 wt % or more, 1 wt % or more, 2 wt % or more, or 2.5 wt % or more, and 10 wt % or less, 8 wt % or less, 7 wt % or less, 6 wt % or less.

In addition, while satisfying the soluble fraction content at −20° C., the weight average molecular weight of the soluble fraction (Mw(SF)) may be 22,000 g/mol or more, particularly, 23,000 g/mol or more, 24,000 g/mol or more, 25,000 g/mol or more, and 100,000 g/mol or less, less than 60,000 g/mol, 60,000 g/mol or less, 50,000 g/mol or less, 45,000 g/mol or less, 40,000 g/mol or less.

It is known that the olefin-based copolymer eluted at a low elution temperature is a low-crystallinity copolymer having low stereoregularity, high comonomer content and low density. Particularly, as measured in the present invention, the soluble fraction at −20° C. includes components having extremely very low crystallinity and has strong amorphous properties, and is expressed as an ultralow crystallinity region. In general polymerization, if copolymerization properties are extremely increased, the molecular weight of a polymer decreases in inverse proportion. As a result, the ultralow crystallinity soluble fraction which is eluted at −20° C. or less generally has a very low molecular weight when compared with the whole olefin-based copolymer.

Meanwhile, the soluble fraction of −20° C. has ultralow crystallinity, and has a very low density and excellent elasticity, and if prepared into a polypropylene-based composite material, effects of improving impact strength are achieved. On the contrary, considering the molecular weight, the molecular weight is markedly low in contrast to the molecular weight of the whole olefin-based copolymer, and the soluble fraction causes the decrease of mechanical strength such as tensile strength, and accordingly, there are problems of showing weak impact strength at low temperature and at high temperature.

On the contrary, in the olefin-based copolymer of the present invention, the content of the soluble fraction at −20° C. measured by CFC as described above is 0.5 to 20 wt %, but various physical properties such as flexural strength and hardness as well as tearing strength and tensile strength are excellent. This is achieved because the weight average molecular weight of the soluble fraction shows a high value of 22,000 g/mol or more.

According to the condition (c), the value of Mw:Mw(SF), which is a ratio of a weight average molecular weight of the olefin-based copolymer (Mw) according to the present invention and the weight average molecular weight of the soluble fraction (Mw(SF), is 0.9:1 to 2:1.

As described above, the olefin-based copolymer of the present invention has a high weight average molecular weight value of the soluble fraction at −20° C. measured by CFC. In addition, the molecular weight distribution is considered uniformed irrespective of crystallinity when compared with the conventional copolymer such that, even though compared with the total weight average molecular weight (Mw) of the olefin-based copolymer, the value of Mw:Mw(SF) satisfies 0.9:1 to 2:1. As described above, because the molecular weight in the ultralow crystalline region which is the soluble fraction at −20° C. maintains a similar level in contrast to the total molecular weight, mechanical properties such as tensile strength are excellent while having the similar level of impact strength with respect to the conventional olefin-based copolymer.

The value of Mw:Mw(SF) may be 0.9:1 to 2:1, 1:1 to 2:1, 1.5:1 to 2:1, or 1.7:1 to 2:1, and if the ratio of Mw(SF) with respect to Mw increases, the impact strength of the olefin-based copolymer at low temperature and at high temperature may also be improved.

In addition, the olefin-based copolymer of the present invention shows a low density of 0.85 g/cc to 0.89 g/cc, particularly, 0.8500 g/cc or more, 0.8550 g/cc or more, 0.8600 g/cc or more, and 0.8900 g/cc or less, 0.8800 g/cc or less, if measured according to ASTM D-792. That is, the olefin-based copolymer according to the present invention may be an olefin-based copolymer with a low density, which satisfies the conditions of (a) to (c) as described above and has a low density in the above-described range at the same time, but the density value is not limited thereto.

In addition, the olefin-based copolymer of the present invention may satisfy a weight average molecular weight (Mw) of 10,000 to 100,000 g/mol, particularly, 20,000 to 80,000 g/mol, more particularly, 20,000 g/mol or more, 30,000 g/mol or more, 40,000 g/mol or more, 80,000 g/mol or less, 70,000 g/mol or less. The weight average molecular weight (Mw) is a polystyrene conversion molecular weight analyzed by gel permeation chromatography (GPC).

In addition, the olefin-based copolymer of the present invention may have a ratio (Mw/Mn) of a weight average molecular weight (Mw) and a number average molecular weight (Mn), i.e., molecular weight distribution (MWD) of 1.5 to 3.0, particularly, 1.5 or more, 1.8 or more, 3.0 or less, 2.8 or less, 2.5 or less, 2.4 or less.

The olefin-based copolymer of the present invention may have hardness (shore A) of 30 to 80, particularly, 40 to 80, more particularly, 50 to 80. The olefin-based copolymer may show higher hardness (shore A) with the equivalent degrees of density and melt index values when compared with a commonly used conventional olefin-based copolymer, and accordingly, may have improved tearing strength, tensile strength, elongation rate and flexural strength.

As described later, the olefin-based copolymer of the present invention may be an olefin-based copolymer prepared by carrying out polymerization reaction using a transition metal compound represented by Formula 1 as a catalyst and injecting a specific amount of hydrogen, and by preparing by such a preparation method, the olefin-based copolymer of the present invention shows a higher weight average molecular weight value of a soluble fraction at −20° C. and improved physical properties of tearing strength, tensile strength, elongation rate and flexural strength when compared with the conventional olefin-based copolymer.

The olefin-based copolymer of the present invention may be a copolymer of two or more selected from olefin-based monomers, particularly, an alpha-olefin-based monomer, a cyclic olefin-based monomer, a diene olefin-based monomer, a triene olefin-based monomer and a styrene-based monomer, and particularly, a copolymer of ethylene and an alpha-olefin-based monomer of 3 to 12 carbon atoms, or a copolymer of ethylene and an alpha-olefin-based monomer of 3 to 10 carbon atoms. Particularly, the olefin-based copolymer of the present invention may be a copolymer of ethylene with propylene, ethylene with 1-butene, ethylene with 1-hexene, ethylene with 4-methyl-1-pentene or ethylene with 1-octene.

The alpha-olefin-based monomer may include one or more selected from the group consisting of propylene, 1-butene, 1-pentene, 4-methyl-1-pentene, 1-hexene, 1-heptene, 1-octene, 1-decene, 1-undecene, 1-dodecene, 1-tetradecene, 1-hexadecene, 1-eicocene, norbornene, norbornadiene, ethylidene norbornene, phenyl norbornene, vinyl norbornene, dicyclopentadiene, 1,4-butadiene, 1,5-pentadiene, 1,6-hexadiene, styrene, alpha-methylstyrene, divinylbenzene and 3-chloromethylstyrene, without limitation.

The olefin-based copolymer of the present invention may be prepared by continuous solution polymerization reaction by which an olefin-based monomer is polymerized while continuously injecting hydrogen in the presence of a metallocene catalyst composition including one or more transition metal compounds in a single reactor.

The olefin-based copolymer according to the present invention may be selected from the group consisting of a random copolymer, an alternating copolymer and a graft copolymer, and more particularly, may be a random copolymer.

The olefin-based copolymer may be prepared by a method including a step of polymerizing an olefin-based monomer by injecting hydrogen in 10 to 100 cc/min in the presence of a catalyst composition including a transition metal compound represented by Formula 1, which will be explained later. This will be explained in detail below referring to the preparation method of a polypropylene-based composite material.

Meanwhile, the polypropylene-based composite material of the present invention, if applied to a rubber composition, may include each constituent component in a suitable amount according to the use of the rubber composition and to satisfy the physical properties thus required.

Particularly, the polypropylene-based composite material may include the olefin-based copolymer in 5 to 70 wt %, particularly, 5 to 50 wt %, more particularly, 5 to 40 wt %, more particularly, 10 to 40 wt %.

If the amount of the olefin-based copolymer is less than the mixing ratio, impact strength may decrease, and if the amount is greater than the mixing ratio, tensile strength and hardness may decrease. The significance of improving effects according to the control of the mixing ratio of the polypropylene and olefin-based copolymer may be considered.

The polypropylene-based composite material according to an embodiment of the present invention may selectively further include an inorganic filler to improve the mechanical properties of the polypropylene-based composite material together with the polypropylene and olefin-based copolymer.

The inorganic filler may be a powder-type filler, a flake-type filler, a fiber-type filler, or a balloon-type filler, and any one among them or mixtures of two or more thereof may be used. Particularly, the powder-type filler may include: natural silicic acid or silicate such as fine powder talc, kaolinite, plastic clay, and sericite; carbonate such as settleable calcium carbonate, heavy calcium carbonate and magnesium carbonate; hydroxide such as aluminum hydroxide and magnesium hydroxide; oxide such as zinc oxide, magnesium oxide and titanium oxide; synthetic silicic acid or silicate such as hydrated calcium silicate, hydrated aluminum silicate, hydrated silicic acid and anhydrous silicic acid. In addition, as the flake-type filler, mica, etc. may be included. In addition, as the fiber-type filler, basic magnesium sulfate whisker, calcium titanate whisker, aluminum borate whisker, sepiolite, processed mineral fiber (PMF), potassium titanate, etc. may be included. As the balloon-type filler, glass balloon, etc. may be included. Among them, talc may be used.

In addition, the inorganic filler may be surface treated to improve the strength properties and molding processability of the polypropylene-based composite material.

Particularly, the inorganic filler may be physically or chemically surface treated using a surface treating agent such as a silane coupling agent, a higher fatty acid, a fatty acid metal salt, an unsaturated organic acid, an organic titanate, a resin acid and polyethylene glycol.

In addition, the inorganic filler may have an average particle diameter ($D_{50}$) of 1 μm to 20 μm, more particularly, 7 μm to 15 μm. If the average particle diameter of the inorganic filler is less than 1 μm, when mixing the polypropylene and the olefin-based copolymer, uniform dispersion is difficult due to the agglomeration of inorganic filler particles, and as a result, the improving effects of the mechanical properties of the polypropylene-based composite material may become insignificant. In addition, if the average particle diameter of the inorganic filler is greater than 20 μm, it is apprehended that the physical properties of a rubber composition may be deteriorated due to the deterioration of the dispersibility of the inorganic filler itself.

In the present invention, the average particle diameter ($D_{50}$) of the inorganic filler may be defined as a particle diameter based on 50% of particle diameter distribution. In the present invention, the average particle diameter ($D_{50}$) of the inorganic filler may be measured by, for example, observing electron microscope using scanning electron microscopy (SEM), field emission scanning electron microscopy (FE-SEM), etc., or by a laser diffraction method. In case of measuring by the laser diffraction method, more particularly, the inorganic filler particles are dispersed in a dispersion medium and introduced into a commercially available laser diffraction particle size measurement apparatus (for example, Microtrac MT 3000), and then, an average particle diameter ($D_{50}$) based on 50% of particle diameter distribution in the measurement apparatus may be computed.

The inorganic filler may be included in 0.1 parts by weight to 40 parts by weight with respect to 100 parts by weight of polypropylene. If the amount of the inorganic filler in the polypropylene-based composite material is less than 0.1 parts by weight with respect to 100 parts by weight of polypropylene, improving effects according to the inclusion of the inorganic filler is insignificant, and if the amount is greater than 40 parts by weight, the processability of the polypropylene-based composite material may be deteriorated. More particularly, the inorganic filler may be included in 0.1 wt % to 20 wt % with respect to the total weight of the polypropylene-based composite material.

The polypropylene-based composite material according to an embodiment of the present invention, satisfying the above-described configuration and amount conditions, may be prepared by adding polypropylene and selectively an inorganic filler to an olefin-based copolymer and then heating. In this case, the type and amount of the polypropylene are the same as explained above.

A mixing process may be performed by a common method. Particularly, the mixing may be performed using a super mixer or a ribbon mixer.

In addition, during the mixing process, an additive such as an antioxidant, a thermal stabilizer, an ultraviolet stabilizer, and an antistatic agent may be further included, and to improve coatability, a small amount of an adhesive resin or an additive having a polar group may be selectively further used in a suitable amount range.

In addition, the heating process may be performed at the melting point of polypropylene or higher to a temperature of 210° C. or less. The heating process may be performed using various compounding and processing apparatus such as a twin-screw extruder, a single-screw extruder, a roll-mill, a kneader and a banbury mixer.

The polypropylene-based composite material according to an embodiment of the present invention, prepared by the above-described preparation method may further improve the dispersibility of polypropylene by using optimum two types of olefin-based copolymers combined to improved the impact strength of the polypropylene-based composite material, and as a result, the impact strength may be improved without degrading the mechanical properties such as the tensile strength of the polypropylene-based composite material.

Accordingly, the polypropylene-based composite material according to an embodiment of the present invention is useful for hollow molding, injection molding or extrusion molding in various fields and usages including wrapping, building or daily supplies like materials for cars, wires, toys, fibers or medicine, and has excellent toughness and impact strength at a low temperature as well as at room temperature and very excellent physical properties including heat resistance, rigidity, etc., and accordingly, may be usefully used in the interior or exterior parts of cars.

The polypropylene-based composite material of the present invention may be used for manufacturing molded articles or car parts.

The molded article may particularly include a blow molding molded article, an inflation molded article, a cast molded article, an extrusion laminate molded article, an extrusion molded article, a foam molded article, an injection molded article, a sheet, a film, a fiber, a monofilament, or a nonwoven fabric.

In addition, the car part may be for the interior or exterior material of cars.

Method for Preparing Polypropylene-Based Composite Material

The method for preparing the polypropylene-based composite material of the present invention is characterized in including: (S1) a step of preparing polypropylene; (S2) a step of preparing an olefin-based copolymer by a method including a step of polymerizing an olefin-based monomer by injecting hydrogen in 10 to 100 cc/min in the presence of a catalyst composition including a transition metal compound represented by the following Formula 1: and (S3) a step of melting and kneading the polypropylene and the olefin-based copolymer:

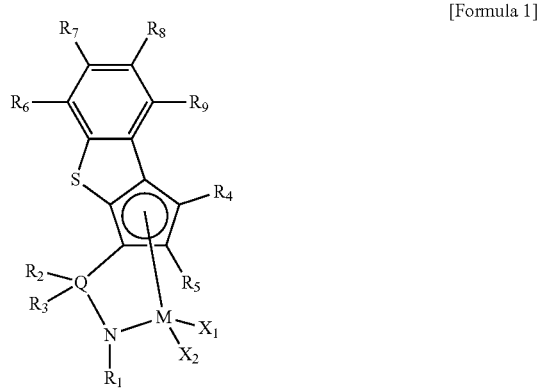

[Formula 1]

in Formula 1, $R_1$ is hydrogen; alkyl of 1 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_2$ and $R_3$ are each independently hydrogen; halogen; alkyl of 1 to 20 carbon atoms; alkenyl of 2 to 20 carbon atoms; aryl of 6 to 20 carbon atoms; arylalkyl of 7 to 20 carbon atoms; alkylaryl of 7 to 20 carbon atoms; alkylamido of 1 to 20 carbon atoms; or arylamido of 6 to 20 carbon atoms, $R_4$ to $R_9$ are each independently hydrogen; silyl; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms, two or more adjacent groups among $R_2$ to $R_9$ are connected with each other to form a ring, Q is Si; C; N; P; or S, M is a transition metal in group 4, and $X_1$ and $X_2$ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

In the transition metal compound of Formula 1, described in the present disclosure, cyclopentadiene to which benzothiophene is fused by ring-type bonding, and an amido group (N—$R_1$) are stably crosslinked by Q (Si; C; N; or P), and a structure where a transition metal in group 4 makes coordination bonds is formed.

If the catalyst composition is applied to the polymerization reaction of the olefin-based monomer, the production of a copolymer having high activity, high molecular weight and high copolymerization properties at a high polymerization temperature may be achieved. Particularly, the transition metal compound of Formula 1 may introduce a large amount of alpha-olefin as well as linear low-density polyethylene with a level of 0.85 g/cc to 0.93 g/cc due to its structural characteristics, and the preparation of a polymer (elastomer) in a ultralow density region of a density of less than 0.910 g/cc is also possible.

In addition, in the present invention, the olefin-based copolymer is prepared by polymerizing an olefin-based monomer by using the catalyst of the transition metal compound represented by Formula 1 and injecting hydrogen in 10 to 100 cc/min, and an olefin-based copolymer having a high weight average molecular weight of a soluble fraction at a low temperature and showing excellent physical properties including tearing strength, tensile strength and elongation rate may be prepared as described above when compared with an olefin-based copolymer prepared by polymerizing a monomer using a transition metal compound not corresponding to Formula 1 or not injecting hydrogen.

In Formula 1, $R_1$ may be hydrogen; alkyl of 1 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms. Preferably, $R_1$ may be alkyl of 1 to 20 carbon atoms; aryl of 6 to 20 carbon atoms; arylalkoxy of 7 to 20 carbon atoms; or arylalkyl of 7 to 20 carbon atoms, and more preferably, may be methyl, ethyl, propyl, butyl, isobutyl, tert-butyl, isopropyl, cyclohexyl, benzyl, phenyl, methoxyphenyl, ethoxyphenyl, fluorophenyl, bromophenyl, chlorophenyl, dimethylphenyl or diethylphenyl.

In Formula 1, $R_2$ and $R_3$ may be each independently hydrogen; alkyl of 1 to 20 carbon atoms; aryl of 6 to 20 carbon atoms; or alkylaryl of 7 to 20 carbon atoms, and preferably, $R_2$ and $R_3$ may be each independently hydrogen; alkyl of 1 to 20 carbon atoms; or aryl of 6 to 20 carbon atoms.

In Formula 1, $R_4$ to $R_9$ may be each independently hydrogen; alkyl of 1 to 20 carbon atoms; aryl of 6 to 20 carbon atoms; alkylaryl of 7 to 20 carbon atoms; or arylalkyl of 7 to 20 carbon atoms.

In Formula 1, $R_4$ and $R_5$ may be the same or different, and may be each independently alkyl of 1 to 20 carbon atoms; or aryl of 6 to 20 carbon atoms.

In Formula 1, $R_4$ and $R_5$ may be the same or different, and may be each independently alkyl of 1 to 6 carbon atoms.

In Formula 1, $R_4$ and $R_5$ may be methyl, ethyl or propyl.

In Formula 1, $R_6$ to $R_9$ may be the same or different and may be each independently hydrogen; alkyl of 1 to 20 carbon atoms; aryl of 6 to 20 carbon atoms; alkylaryl of 7 to 20 carbon atoms, or arylalkyl of 7 to 20 carbon atoms.

In Formula 1, $R_6$ to $R_9$ may be the same or different and may be each independently hydrogen; or alkyl of 1 to 20 carbon atoms.

In Formula 1, $R_6$ to $R_9$ may be the same or different and may be each independently hydrogen or methyl.

In Formula 1, M may be Ti, Hf or Zr.

In Formula 1, $X_1$ and $X_2$ may be the same or different and may be each independently hydrogen, halogen, alkyl of 1 to 20 carbon atoms, or alkenyl of 2 to 20 carbon atoms.

Preferably, $R_1$ is hydrogen; alkyl of 1 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_2$ and $R_3$ are each independently hydrogen; alkyl of 1 to 20 carbon atoms; aryl of 6 to 20 carbon atoms; or alkylaryl of 7 to 20 carbon atoms, $R_4$ to $R_9$ are each independently hydrogen; alkyl of 1 to 20 carbon atoms; aryl of 6 to 20 carbon atoms; alkylaryl of 7 to 20 carbon atoms; or arylalkyl of 7 to 20 carbon atoms, where adjacent two or more among $R_2$ to $R_9$ may be connected with each other to form an aliphatic ring of 5 to 20 carbon atoms or an aromatic ring of 6 to 20 carbon atoms; the aliphatic ring or aromatic ring may be substituted with halogen, alkyl of 1 to 20 carbon atoms, alkenyl of 2 to 20 carbon atoms, or aryl of 6 to 20 carbon atoms, and Q may be Si; C; N; or P.

More preferably, $R_1$ may be alkyl of 1 to 20 carbon atoms; aryl of 6 to 20 carbon atoms; arylalkoxy of 7 to 20 carbon atoms; or arylalkyl of 7 to 20 carbon atoms, $R_2$ and $R_3$ may be each independently hydrogen; alkyl of 1 to 20 carbon atoms; or aryl of 6 to 20 carbon atoms, $R_4$ to $R_9$ may be each independently hydrogen; alkyl of 1 to 20 carbon atoms; or aryl of 6 to 20 carbon atoms, and Q may be Si.

In addition, the transition metal compound represented by Formula 1 may be selected from the group consisting of the following Formula 1-1 to Formula 1-6, but an embodiment is not limited thereto and various compounds within the defined range by Formula 1 may be applied in the present invention:

[Formula 1-1]

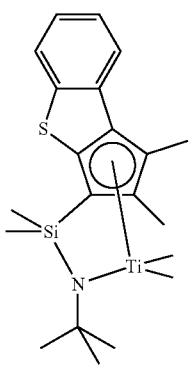

-continued

[Formula 1-2]

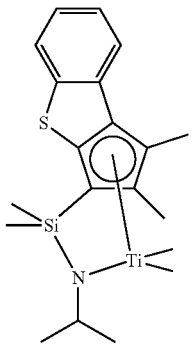

[Formula 1-3]

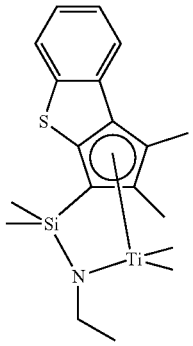

[Formula 1-4]

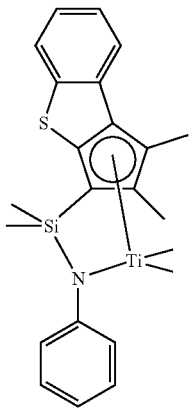

[Formula 1-5]

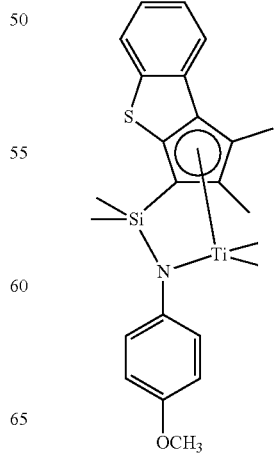

-continued

[Formula 1-6]

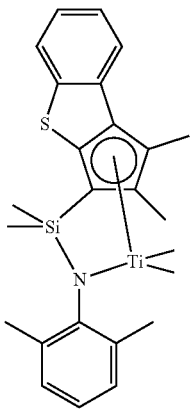

Each substituent used in this disclosure will be explained in detail as follows.

In the present invention, the term "halogen" means fluorine, chlorine, bromine or iodine.

In the present invention, the term "alkyl" means a linear chain or branch chain of a hydrocarbon residual group.

In the present invention, the term "alkenyl" means a linear chain or branch chain of an alkenyl group. The branched chain may be alkyl of 1 to 20 carbon atoms; alkenyl of 2 to 20 carbon atoms; aryl of 6 to 20 carbon atoms; alkylaryl of 7 to 20 carbon atoms; or arylalkyl of 7 to 20 carbon atoms.

In the present invention, the term "aryl" may preferably have 6 to 20 carbon atoms, and may particularly be phenyl, naphthyl, anthracenyl, pyridyl, dimethylanilinyl, anisolyl, etc., without limitation.

In the present invention, the term "silyl" may be silyl substituted with alkyl of 1 to 20 carbon atoms, and may be, for example, trimethylsilyl or triethylsilyl.

In the present invention, the term "alkylaryl" means an aryl group substituted with the alkyl group.

In the present invention, the term "arylalkyl" means an alkyl group substituted with the aryl group.

In the present invention, the term "alkyl amino" means an amino group substituted with the alkyl group, and includes a dimethylamino group, a diethylamino group, etc., without limitation.

In the present invention, the term "hydrocarbyl group" means a monovalent hydrocarbon group of 1 to 20 carbon atoms, which is composed of only carbon and hydrogen irrespective of its structure, such as alkyl, aryl, alkenyl, alkynyl, cycloalkyl, alkylaryl and arylalkyl, unless otherwise referred to.

The transition metal compound represented by Formula 1 may be used solely, or as a composition type including one or more promoter compounds represented by Formula 2 to Formula 4 below in addition to the transition metal compound of Formula 1, as a catalyst of the polymerization reaction of an olefin-based monomer. The promoter compound may assist the activation of the transition metal compound of Formula 1 above.

—[Al($R_{10}$)—O]$_a$—  [Formula 2]

A($R_{10}$)$_3$  [Formula 3]

[L-H]$^+$[W(D)$_4$]$^-$ or [L]$^+$[W(D)$_4$]$^-$  [Formula 4]

In Formulae 2 to 4, $R_{10}$ groups may be the same or different from each other and each independently selected from the group consisting of halogen, hydrocarbyl of 1 to 20 carbon atoms, and halogen-substituted hydrocarbyl of 1 to 20 carbon atoms, A is aluminum or boron, each D is independently aryl of 6 to 20 carbon atoms or alkyl of 1 to 20 carbon atoms, of which one or more hydrogen atoms may be substituted with substituents, wherein the substituent is at least any one selected from the group consisting of halogen, hydrocarbyl of 1 to 20 carbon atoms, alkoxy of 1 to 20 carbon atoms and aryloxy of 6 to 20 carbon atoms, H is a hydrogen atom, L is a neutral or cationic Lewis acid, W is an element in group 13, and a is an integer of 2 or more.

The compound represented by Formula 2 may include alkylaluminoxane such as methylaluminoxane (MAO), ethylaluminoxane, isobutylaluminoxane and butylalminoxane, and a modified alkylaluminoxane obtained by mixing two or more types of the alkylaluminoxane, particularly, methylaluminoxane, modified methylaluminoxane (MAO), without limitation.

The compound represented by Formula 3 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, etc. and particularly, may be selected from trimethylaluminum, triethylaluminum and triisobutylaluminum, without limitation.

The compound represented by Formula 4 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliumtetraphenylboron, N,N-diethylaniliumtetrapentafluorophenylboron, diethylammoniumtetrapentafluorophenylboron, triphenylphosphoniumtetraphenylboron, trimethylphosphoniumtetraphenylboron, dimethylanilium tetrakis(pentafluorophenyl) borate, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl) aluminum, tributylammoniumtetra(p-trifluoromethylphenyl)aluminum, trimethylammoniumtetra (p-trifluoromethylphenyl)aluminum, tributylammoniumtetrapentafluorophenylaluminum, N,N-diethylaniliniumtetraphenylaluminum, N,N-diethylaniliumtetrapentafluorophenylaluminum, diethylammoniumtetrapentafluorophenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl) boron, triphenylcarboniumtetra(p-trifluoromethylphenyl) boron, or triphenylcarboniumtetrapentafluorophenylboron, without limitation.

The catalyst composition may be prepared by, as a first method, a preparation method including a step of obtaining a mixture by contacting the transition metal compound represented by Formula 1 with the compound represented by Formula 2 or Formula 3; and a step of adding the compound represented by Formula 4 to the mixture.

In this case, the molar ratio of the transition metal compound represented by Formula 1 and the compound represented by Formula 2 or Formula 3 may be 1:2 to 1:5,000, particularly, 1:10 to 1:1,000, more particularly, 1:2 to 1:500.

If the molar ratio of the transition metal compound represented by Formula 1 and the compound represented by Formula 2 or Formula 3 is less than 1:2, the amount of an alkylating agent is too small, and the alkylation of a metal compound may be incompletely carried out, and if the molar ratio is greater than 1:5,000, the alkylation of the metal compound may be achieved, but the activation of the alkylated metal compound may be incompletely carried out due to the side reactions between an excessive amount of the alkylating agent remained and an activating agent of the compound of Formula 4.

In addition, the molar ratio of the transition metal compound represented by Formula 1 and the compound represented by Formula 4 may be 1:1 to 1:25, particularly, 1:1 to 1:10, more particularly, 1:1 to 1:5. If the molar ratio of the transition metal compound represented by Formula 1 and the compound represented by Formula 4 is less than 1:1, the amount of an activating agent is relatively small, and the activation of the metal compound may be incompletely carried out, and thus, the activity of the catalyst composition may be deteriorated. If the molar ratio is greater than 1:25, the activation of the metal compound may be completely carried out, but due to the excessive amount of the activating agent remained, it would not be economical considering the unit cost of the catalyst composition, or the purity of a polymer produced may be degraded.

In addition, the catalyst composition may be prepared by, as a second method, a method of contacting the transition metal compound represented by Formula 1 with the compound represented by Formula 2.

In this case, the molar ratio of the transition metal compound represented by Formula 1 and the compound represented by Formula 2 may be 1:10 to 1:10,000, particularly, 1:100 to 1:5,000, more particularly, 1:500 to 1:3,000. If the molar ratio is less than 1:10, the amount of an activating agent is relatively small, and the activation of a metal compound may be incompletely carried out, and the activity of the catalyst composition thus produced may be degraded. If the molar ratio is greater than 1:10,000, the activation of the metal compound may be completely carried out, but due to the excessive amount of the activating agent remained, it would not be economical considering the unit cost of the catalyst composition, or the purity of a polymer produced may be degraded.

As the reaction solvent during preparing the catalyst composition, a hydrocarbon-based solvent such as pentane, hexane, and heptane, or an aromatic solvent such as benzene and toluene may be used, without limitation.

In addition, the catalyst composition may include the transition metal compound and the promoter compound in a supported type on a support. Any supports used in a metallocene-based catalyst may be used as the support without specific limitation. Particularly, the support may be silica, silica-alumina or silica-magnesia, and any one among them or mixtures of two or more thereof may be used.

In case where the support is silica among them, since a silica support and the functional group of the metallocene compound of Formula 1 form a chemical bond, there is no catalyst separated from the surface during an olefin polymerization process. As a result, the generation of fouling, by which polymer particles are agglomerated on the wall side of a reactor or from each other during the preparation process of an olefin-based copolymer, may be prevented. In addition, the particle shape and apparent density of a polymer of the olefin-based copolymer prepared in the presence of a catalyst including the silica support are excellent.

More particularly, the support may be silica or silica-alumina, including a highly reactive siloxane group and dried at a high temperature through a method of drying at a high temperature, etc.

The support may further include an oxide, a carbonate, a sulfate, or a nitrate component such as $Na_2O$, $K_2CO_3$, $BaSO_4$ and $Mg(NO_3)_2$.

The drying temperature of the support is preferably, from 200 to 800° C., more preferably, from 300 to 600° C., most preferably, from 300 to 400° C. If the drying temperature of the support is less than 200° C., humidity is too high and water at the surface may react with the promoter, and if the temperature is greater than 800° C., the pores at the surface of the support may be combined to decrease the surface area, and a large amount of the hydroxyl groups at the surface may be removed to remain only siloxane groups to decrease reaction sites with the promoter, undesirably.

In addition, the amount of the hydroxyl group at the surface of the support may preferably be 0.1 to 10 mmol/g, and more preferably, 0.5 to 5 mmol/g. The amount of the hydroxyl group at the surface of the support may be controlled by the preparation method and conditions of the support, or drying conditions such as temperature, time, vacuum and spray drying.

The polymerization of the olefin-based copolymer may be performed at about 50 to 200° C., 50° C. or higher, 70° C. or higher, 100° C. or higher, 200° C. or less, 180° C. or less, 160° C. or less, 150 or less.

In addition, the polymerization of the olefin-based copolymer may be performed at a pressure of 1 $kgf/cm^2$ to 150 $kgf/cm^2$, preferably, 1 $kgf/cm^2$ to 120 $kgf/cm^2$, more preferably, 5 $kgf/cm^2$ to 100 $kgf/cm^2$.

The polymerization reaction of the olefin monomer may be performed in an inert solvent, and as the inert solvent, benzene, toluene, xylene, cumene, heptane, cyclohexane, methylcyclohexane, methylcyclopentane, n-hexane, 1-hexene, and 1-octene may be used, without limitation.

EXAMPLES

Hereinafter, the present invention will be explained in more detail referring to embodiments. However, the embodiments are provided only for illustration, and the scope of the present invention is not limited thereto.

Preparation of Transition Metal Compound

Synthetic Example 1

Preparation of Ligand Compound

Synthesis of N-tert-butyl-1-(1,2-dimethyl-3H-benzo[b]cyclopenta[d]thiophene-3-yl)-1,1-dimethylsilaneamine

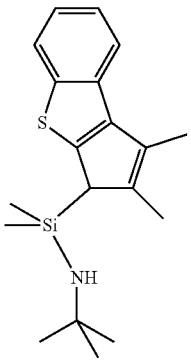

To a 100 ml schlenk flask, 4.65 g (15.88 mmol) of chloro(1,2-dimethyl-3H-benzo[b]cyclopenta[d]thiophene-3-yl)dimethylsilane was weighed and added, and 80 ml of THF was put thereto. At room temperature, tBuNH$_2$ (4 eq, 6.68 ml) was put thereto, followed by reacting at room temperature for 3 days. After finishing the reaction, THF was removed and the resultant reaction product was filtered with hexane. After drying solvents, 4.50 g (86%) of a yellow liquid was obtained.

$^1$H-NMR (in CDCl$_3$, 500 MHz): 7.99 (d, 1H), 7.83 (d, 1H), 7.35 (dd, 1H), 7.24 (dd, 1H), 3.49 (s, 1H), 2.37 (s, 3H), 2.17 (s, 3H), 1.27 (s, 9H), 0.19 (s, 3H), −0.17 (s, 3H).

Preparation of Transition Metal Compound

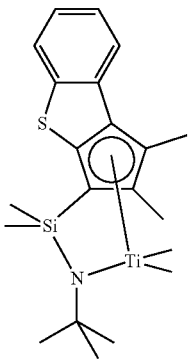

To a 50 ml schlenk flask, the ligand compound (1.06 g, 3.22 mmol/1.0 eq) and MTBE 16.0 ml (0.2 M) were put and stirred first. n-BuLi (2.64 ml, 6.60 mmol/2.05 eq, 2.5 M in THF) was added thereto at −40° C., followed by reacting at room temperature overnight. After that, MeMgBr (2.68 ml, 8.05 mmol/2.5 eq, 3.0 M in diethyl ether) was slowly added thereto dropwisely at −40° C., and TiCl$_4$ (2.68 ml, 3.22 mmol/1.0 eq, 1.0 M in toluene) was put in order, followed by reacting at room temperature overnight. After that, the reaction mixture was passed through celite for filtration using hexane. After dying the solvents, 1.07 g (82%) of a brown solid was obtained.

$^1$H-NMR (in CDCl$_3$, 500 MHz): 7.99 (d, 1H), 7.68 (d, 1H), 7.40 (dd, 1H), 7.30 (dd, 1H), 3.22 (s, 1H), 2.67 (s, 3H), 2.05 (s, 3H), 1.54 (s, 9H), 0.58 (s, 3H), 0.57 (s, 3H), 0.40 (s, 3H), −0.45 (s, 3H).

Comparative Synthetic Example 1

Preparation of Ligand Compound

Synthesis of N-tert-butyl-1-(1,2-dimetyl-3H-benzo[b]cyclopenta[d]thiophene-3-yl)-1,1-(methyl)(phenyl)silaneamine

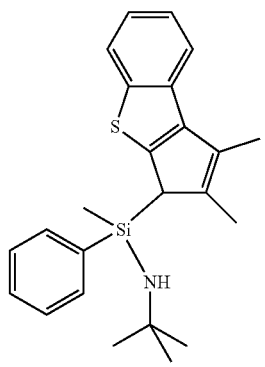 [SMILES: CC1=C(C)C([Si](C)(NC(C)(C)C)c2ccccc2)c2sc3ccccc3c21]

(i) Preparation of chloro-1-(1,2-dimethyl-3H-benzo[b]cyclopenta[d]thiophene-3-yl)-1,1-(methyl)(phenyl)silane To a 250 ml schlenk flask, 10 g (1.0 eq, 49.925 mmol) of 1,2-dimethyl-3H-benzo[b]cyclopenta[d]thiophene and 100 ml of THF were put, and 22 ml (1.1 eq, 54.918 mmol, 2.5 M in hexane) of n-BuLi was added thereto dropwisely at −30° C., followed by stirring at room temperature for 3 hours. A stirred Li-complex THF solution was cannulated into a schlenk flask containing 8.1 ml (1.0 eq, 49.925 mmol) of dichloro(methyl)(phenyl)silane and 70 ml of THF at −78° C., followed by stirring at room temperature overnight. After stirring, drying in vacuum was carried out and extraction with 100 ml of hexane was carried out.

(ii) Preparation of N-tert-butyl-1-(1,2-dimethyl-3H-benzo[b]cyclopenta[d]thiophene-3-yl)-1,1-(methyl)(phenyl)silaneamine To 100 ml of an extracted chloro-1-(1,2-dimethyl-3H-benzo[b]cyclopenta[d]thiophene-3-yl)-1,1-(methyl)(phenyl)silane hexane solution, 42 ml (8 eq, 399.4 mmol) of t-BuNH$_2$ was put at room temperature, followed by stirring at room temperature overnight. After stirring, drying in vacuum was carried out and extraction with 150 ml of hexane was carried out. After drying the solvents, 13.36 g (68%, dr=1:1) of a yellow solid was obtained.

$^1$H NMR (CDCl$_3$, 500 MHz): δ 7.93 (t, 2H), 7.79 (d, 1H), 7.71 (d, 1H), 7.60 (d, 2H), 7.48 (d, 2H), 7.40-7.10 (m, 10H, aromatic), 3.62 (s, 1H), 3.60 (s, 1H), 2.28 (s, 6H), 2.09 (s, 3H), 1.76 (s, 3H), 1.12 (s, 18H), 0.23 (s, 3H), 0.13 (s, 3H).

Preparation of Transition Metal Compound

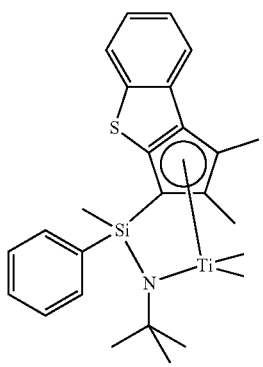

To a 100 ml schlenk flask, 4.93 g (12.575 mmol, 1.0 eq) of a ligand compound and 50 ml (0.2 M) of toluene were put and 10.3 ml (25.779 mmol, 2.05 eq, 2.5M in hexane) of n-BuLi was added thereto dropwisely at −30° C., followed by stirring at room temperature overnight. After stirring, 12.6 ml (37.725 mmol, 3.0 eq, 3.0 M in diethyl ether) of MeMgBr was added thereto dropwisely, 13.2 ml (13.204 mmol, 1.05 eq, 1.0 M in toluene) of $TiCl_4$ was put in order, followed by stirring at room temperature overnight. After stirring, drying in vacuum and extraction with 150 ml of hexane were carried out, the solvent was removed to 50 ml, and 4 ml (37.725 mmol, 3.0 eq) of DME was added dropwisely, followed by stirring at room temperature overnight. Again, drying in vacuum and extraction with 150 ml of hexane were carried out. After dying the solvents, 2.23 g (38%, dr=1:0.5) of a brown solid was obtained.

$^1$H NMR ($CDCl_3$, 500 MHz): δ 7.98 (d, 1H), 7.94 (d, 1H), 7.71 (t, 6H), 7.50-7.30 (10H), 2.66 (s, 3H), 2.61 (s, 3H), 2.15 (s, 3H), 1.62 (s, 9H), 1.56 (s, 9H), 1.53 (s, 3H), 0.93 (s, 3H), 0.31 (s, 3H), 0.58 (s, 3H), 0.51 (s, 3H), −0.26 (s, 3H), −0.39 (s, 3H).

Preparation of Olefin-Based Copolymer

Preparation Example 1

In a 1.5 L autoclave continuous process reactor, a hexane solvent (7 kg/h) and 1-butene (0.95 kg/h) were charged, and the top of the reactor was pre-heated to a temperature of 141° C. A triisobutylaluminum compound (0.05 mmol/min), the transition metal compound (0.17 μmol/min) obtained in Synthetic Example 1 as a catalyst, and a dimethylanilium tetrakis(pentafluorophenyl) borate promoter (0.51 μmol/min) were put into the reactor at the same time. Then, into the autoclave reactor, ethylene (0.87 kg/h) and a hydrogen gas (12 cc/min) were injected and a copolymerization reaction was continuously carried out while maintaining a pressure of 89 bar and 141° C. for 30 minutes or more to prepare a copolymer. After drying for 12 hours or more, physical properties were measured.

Preparation Example 2

An olefin-based copolymer was prepared by carrying out the same method as in Preparation Example 1 except for changing reaction conditions as shown in Table 1 below.

Comparative Preparation Example 1

DF7350 (Mitsui Co.) was purchased and used.

Comparative Preparation Example 2

EG8137 (Dow Co.) was purchased and used.

Comparative Preparation Examples 3 and 4: Preparation of Olefin-Based Copolymers Copolymers were prepared by carrying out the same method as in Preparation Example 1 except for using the catalyst of Synthetic Example 1, not injecting a hydrogen gas, and changing the amounts of other materials as shown in Table 1 below for Comparative Example 3, and using the catalyst of Comparative Synthetic Example 1, and changing the amounts of other materials as shown in Table 1 below as Comparative Example 4.

Comparative Preparation Example 5

EG8842 (Dow Co.) was purchased and used.

TABLE 1

| | Catalyst type | Catalyst content (μmol/min) | Promoter (μmol/min) | TiBAl (mmol/min) | Ethylene (kg/h) | Hydrogen (cc/min) | Hexane (kg/h) | Alpha olefin monomer 1-butene (kg/h) | Alpha olefin monomer 1-octene (kg/h) | Reaction temperature (° C.) |
|---|---|---|---|---|---|---|---|---|---|---|
| Preparation Example 1 | Synthetic Example 1 | 0.17 | 0.51 | 0.05 | 0.87 | 12 | 7 | 0.95 | — | 141 |
| Preparation Example 2 | Synthetic Example 1 | 0.48 | 1.44 | 0.10 | 0.87 | 8 | 7 | — | 1.87 | 140 |
| Comparative Preparation Example 1 | | | | | DF7350 | | | | | |
| Comparative Preparation Example 2 | | | | | EG8137 | | | | | |
| Comparative Preparation Example 3 | Synthetic Example 1 | 0.38 | 1.14 | 0.05 | 0.87 | — | 5 | 1 | — | 150 |

TABLE 1-continued

| | Catalyst type | Catalyst content (μmol/min) | Promoter (μmol/min) | TiBAl (mmol/min) | Ethylene (kg/h) | Hydrogen (cc/min) | Hexane (kg/h) | Alpha olefin monomer | | Reaction temperature (° C.) |
|---|---|---|---|---|---|---|---|---|---|---|
| | | | | | | | | 1-butene (kg/h) | 1-octene (kg/h) | |
| Comparative Preparation Example 4 | Comparative Synthetic Example 1 | 0.235 | 0.705 | 0.05 | 0.87 | 23 | 7 | 0.85 | — | 141 |
| Comparative Preparation Example 5 | | | | | EG8842 | | | | | |

Evaluation of Physical Properties of Olefin-Based Copolymer

Experimental Example 1

With respect to the olefin-based copolymers of Preparation Examples 1 and 2, and Comparative Preparation Examples 1 to 5, physical properties were evaluated according to the methods below and are shown in Table 2 below.
(1) Density
Measurement was conducted according to ASTM D-792.
(2) Melt Index (MI)
Measurement was conducted according to ASTM D-1238 (condition E, 190° C., 2.16 kg load).
(3) Weight Average Molecular Weight (g/Mol) and Molecular Weight Distribution (MWD)
Number average molecular weight (Mn) and weight average molecular weight (Mw) were measured respectively, using gel permeation chromatography (GPC), and molecular weight distribution was calculated through dividing the weight average molecular weight by the number average molecular weight. The weight average molecular weight (Mw) thus measured and molecular weight distribution (MWD) show values for the total fraction of the polymer prepared.
  column: PL Olexis
  solvent: trichlorobenzene (TCB)
  flow rate: 1.0 ml/min
  specimen concentration: 1.0 mg/ml
  injection amount: 200 μl
  column temperature: 160° C.
  Detector: Agilent High Temperature RI detector
  Standard: Polystyrene (calibrated by cubic function)
(4) Melting Temperature (Tm)
The melting temperature was obtained using a differential scanning calorimeter (DSC 6000) manufactured by PerKinElmer Co. That is, the temperature was elevated to 200° C., kept for 1 minute, and decreased to −100° C., and then, the temperature was elevated again. The apex of a DSC curve was set to the melting point. In this case, the elevating rate and decreasing rate of the temperature were controlled to 10° C./min, and the melting point was obtained during the second elevation of the temperature.
(5) Elution Temperature (Te)
CFC of PolymerChar Co. was used as a measurement apparatus. First, the polymer solution was completely dissolved using o-dichlorobenzene as a solvent at 130° C. for minutes in an oven in a CFC analyzer, and then the solution was introduced into a TREF column controlled to 130° C. Then, the column was cooled to 95° C. and stabilized for 45 minutes. Then, the temperature of the TREF column was decreased to −20° C. in a rate of 0.5° C./min, and was kept at −20° C. for 10 minutes. After that, an elution amount (mass %) was measured using an infrared spectrophotometer. Then, the temperature of the TREF column was increased in a rate of 20° C./min to a preset temperature and at the reached temperature, the temperature was maintained for a preset time (that is, about 27 minutes), and this work was repeated until the temperature of the TREF reached 130° C., and the amount (mass %) of an eluted fraction in each temperature range was measured. In addition, a weight average molecular weight (Mw) was measured by the same measurement principle of GPC except for sending the eluted fraction at each temperature to a GPC column and using o-dichlorobenzene as a solvent.
The elution temperature (Te) means a temperature corresponding to the apex among peaks present after −20° C. on a graph of temperature vs. elution fraction.
(6) Measurement of Soluble Fraction (SF) Content
The soluble fraction (SF) content means the amount of a fraction eluted at −20° C. or less, and the weight average molecular weight of the soluble fraction (Mw(SF)) was measured using a GPC column of CFC.
(7) Weight Average Molecular Weight of Soluble Fraction (Mw(SF)) and Mw:Mw(SF)
Mw:Mw(SF) was calculated as a ratio of the weight average molecular weight (Mw) measured by GPC and the weight average molecular weight of a soluble fraction (Mw(SF)) measured by CFC.

TABLE 2

| | Density (g/cc) | MI (g/10 min) | Mw | MWD | Tm (° C.) | Te (° C.) | SF (%) | Mw (SF) | Mw:Mw (SF) |
|---|---|---|---|---|---|---|---|---|---|
| Preparation Example 1 | 0.8698 | 29.9 | 44043 | 2.03 | 55.6 | 17.0 | 5.0 | 25092 | 1.8:1 |
| Preparation Example 2 | 0.8674 | 12.6 | 65269 | 2.14 | 57.4 | 19.9 | 2.9 | 34750 | 1.9:1 |
| Comparative Preparation Example 1 | 0.8700 | 29.5 | 44489 | 1.91 | 53.9 | 18.2 | 4.4 | 9877 | 4.5:1 |

TABLE 2-continued

|  | Density (g/cc) | MI (g/10 min) | Mw | MWD | Tm (° C.) | Te (° C.) | SF (%) | Mw (SF) | Mw:Mw (SF) |
|---|---|---|---|---|---|---|---|---|---|
| Comparative Preparation Example 2 | 0.8700 | 30.3 | 47495 | 2.12 | 53.6 | 17.6 | 4.6 | 10481 | 4.5:1 |
| Comparative Preparation Example 3 | 0.8702 | 28.3 | 45016 | 1.96 | 55.9 | 17.3 | 4.8 | 5587 | 8.1:1 |
| Comparative Preparation Example 4 | 0.8690 | 12.5 | 63581 | 2.04 | 61.1 | 23.3 | 3.3 | 20800 | 3.1:1 |
| Comparative Preparation Example 5 | 0.8590 | 0.95 | 132023 | 2.02 | 43.1 | 7.7 | 5.3 | 135552 | 0.97:1 |

As shown in Table 2, in Preparation Examples 1 and 2, by which the olefin-based copolymers prepared by using the transition metal compound of Formula 1 and injecting hydrogen, the soluble fractions showed high values of a molecular weight of 22,000 or more, and at the same time, ratios with respect to the total weight average molecular weight of the olefin-based copolymer were included in 0.9:1 to 2:1 and the weight average molecular weights of the soluble fractions showed similar levels as the total weight average molecular weight.

In contrast, in Comparative Preparation Examples 1 and 2, which are commercially available, Comparative Preparation Example 3 by which polymerization was conducted without injecting hydrogen, and Comparative Preparation Example 4 using the catalyst of Comparative Synthetic Example 1 which does not correspond to Formula 1, the weight average molecular weights of soluble fractions were less than 22,000 g/mol, and ratios with respect to the weight average molecular weight of the total olefin-based copolymer were 3.1:1 to 8.1:1, showing a large difference.

Particularly, as in Comparative Preparation Example 5, it was confirmed that if the ratio of the weight average molecular weight of the soluble fraction with respect to the total weight average molecular weight was increased, the maintenance of the melt index high and to 10 g/10 min or more, at the same time, was difficult.

Example 1: Preparation of Polypropylene-Based Composite Material

To 20 parts by weight of the olefin-based copolymer prepared in Preparation Example 1, 60 parts by weight of high-crystallinity impact copolymer polypropylene (CB5230, DAELIM Industrial Co., Ltd.) having a melt index of 30 g/10 min, and 20 parts by weight of talc (KCNAP-400™, Coats Co.) (average particle diameter ($D_{50}$)=11.0 μm) were added, and then, 0.01 parts by weight of AO1010 as an antioxidant, 0.01 parts by weight of tris(2,4-di-tert-butylphenyl)phosphite (A0168), and 0.3 parts by weight of Ca-St as a slip agent were added. Then, the resultant mixture was melted and kneaded using a twin screw extruder to prepare a polypropylene-based composite material compound in a pellet shape. In this case, the twin screw extruder has a diameter of 25 Φ and a ratio of length to diameter of 40, and conditions were set to a barrel temperature of 160° C. to 210° C., a screw rotation velocity of 250 rpm, and an extrusion rate of 25 kr/hr.

Examples 2 to 5, and Comparative Examples 1 to 11

Polypropylene-based composite materials were prepared by the same method as in Example 1 except for changing the type of olefin-based copolymers used, and the amount of each material as in the table below.

TABLE 3

|  | Olefin-based copolymer | | Polypropylene (parts by weight) | | Talc (parts by weight) |
|---|---|---|---|---|---|
|  | Type | Parts by weight | CB5230 (melt index of 30 g/10 min) | CB5290 (melt index of 90 g/10 min) |  |
| Example 1 | Preparation Example 1 | 20 | 60 | 0 | 20 |
| Example 2 | Preparation Example 1 | 20 | 0 | 65 | 15 |
| Example 3 | Preparation Example 1 | 20 | 0 | 60 | 20 |
| Example 4 | Preparation Example 2 | 20 | 60 | 0 | 20 |
| Example 5 | Preparation Example 2 | 30 | 0 | 50 | 20 |
| Comparative Example 1 | Comparative Preparation Example 1 | 20 | 60 | 0 | 20 |
| Comparative Example 2 | Comparative Preparation Example 2 | 20 | 60 | 0 | 20 |
| Comparative Example 3 | Comparative Preparation Example 5 | 20 | 60 | 0 | 20 |

TABLE 3-continued

|  | Olefin-based copolymer | | Polypropylene (parts by weight) | | Talc |
|---|---|---|---|---|---|
|  | Type | Parts by weight | CB5230 (melt index of 30 g/10 min) | CB5290 (melt index of 90 g/10 min) | (parts by weight) |
| Comparative Example 4 | Comparative Preparation Example 1 | 20 | 0 | 65 | 15 |
| Comparative Example 5 | Comparative Preparation Example 2 | 20 | 0 | 65 | 15 |
| Comparative Example 6 | Comparative Preparation Example 1 | 20 | 0 | 60 | 20 |
| Comparative Example 7 | Comparative Preparation Example 2 | 20 | 0 | 60 | 20 |
| Comparative Example 8 | Comparative Preparation Example 3 | 20 | 0 | 60 | 20 |
| Comparative Example 9 | Comparative Preparation Example 3 | 20 | 60 | 0 | 20 |
| Comparative Example 10 | Comparative Preparation Example 4 | 20 | 60 | 0 | 20 |
| Comparative Example 11 | Comparative Preparation Example 4 | 30 | 0 | 50 | 20 |

However, in Comparative Example 3, since the melt index of a copolymer was very low and processability was bad, the successful preparation of a polypropylene-based composite material by the above-described preparation method was very difficult.

Experimental Example 2: Evaluation of Physical Properties of Polypropylene-Based Composite Material With respect to the polypropylene-based copolymers of the Examples and Comparative Examples, specimens were manufactured by injection molding using an injection machine at a temperature of 200° C. and stood in a constant temperature and humidity room for 1 day, and physical properties were measured according to the methods below.

(1) Density
Measurement was conducted according to ASTM D-792.
(2) Melt Index (MI)
Measurement was conducted according to ASTM D-1238 (condition E, 230° C., 2.16 kg load).
(3) Tensile Strength
Measurement was conducted using INSTRON 3365 apparatus according to ASTM D638.
(4) Flexural Strength and Flexural Modulus
Measurement was conducted using INSTRON 3365 apparatus according to ASTM D790.
(5) Impact Strength at Low Temperature and at Room Temperature
Measurement was conducted according to ASTM D256, impact strength at low temperature was measured at −30° C. after 12 hours, and impact strength at room temperature was measured at 23° C. after 48 hours.

TABLE 4

|  | Specific gravity (g/ml) | Melt index (g/10 min) | Tensile strength (kgf/cm$^2$) | Flexural strength (kgf/cm$^2$) | Flexural modulus (kgf/cm$^2$) | Impact strength at low temperature (kgf · m/m) | Impact strength at high temperature (kgf · m/m) |
|---|---|---|---|---|---|---|---|
| Example 1 | 1.026 | 23.0 | 225 | 341 | 19861 | 3.7 | 22.8 |
| Comparative Example 1 | 1.032 | 23.1 | 223 | 338 | 19614 | 3.5 | 21.5 |
| Comparative Example 2 | 1.033 | 23.6 | 215 | 325 | 19613 | 3.4 | 21.6 |

TABLE 5

|  | Specific gravity (g/ml) | Melt index (g/10 min) | Tensile strength (kgf/cm$^2$) | Flexural strength (kgf/cm$^2$) | Flexural modulus (kgf/cm$^2$) | Impact strength at low temperature (kgf · m/m) | Impact strength at high temperature (kgf · m/m) |
|---|---|---|---|---|---|---|---|
| Example 2 | 0.993 | 38.4 | 217 | 330 | 18915 | 4.1 | 22.4 |
| Comparative Example 4 | 0.999 | 37.0 | 217 | 329 | 18511 | 3.8 | 22.3 |

TABLE 5-continued

|  | Specific gravity (g/ml) | Melt index (g/10 min) | Tensile strength (kgf/cm$^2$) | Flexural strength (kgf/cm$^2$) | Flexural modulus (kgf/cm$^2$) | Impact strength at low temperature (kgf · m/m) | Impact strength at high temperature (kgf · m/m) |
|---|---|---|---|---|---|---|---|
| Comparative Example 5 | 0.999 | 36.7 | 208 | 318 | 18715 | 3.8 | 20.8 |

TABLE 6

|  | Specific gravity (g/ml) | Melt index (g/10 min) | Tensile strength (kgf/cm$^2$) | Flexural strength (kgf/cm$^2$) | Flexural modulus (kgf/cm$^2$) | Impact strength at low temperature (kgf · m/m) | Impact strength at high temperature (kgf · m/m) |
|---|---|---|---|---|---|---|---|
| Example 3 | 1.039 | 34.9 | 214 | 327 | 19840 | 3.8 | 22.9 |
| Comparative Example 6 | 1.033 | 34.7 | 212 | 327 | 19500 | 3.6 | 22.3 |
| Comparative Example 7 | 1.025 | 32.3 | 210 | 317 | 19231 | 3.6 | 22.6 |
| Comparative Example 8 | 1.032 | 33.9 | 201 | 309 | 19104 | 3.4 | 20.2 |

TABLE 7

|  | Specific gravity (g/ml) | Melt index (g/10 min) | Tensile strength (kgf/cm$^2$) | Flexural strength (kgf/cm$^2$) | Flexural modulus (kgf/cm$^2$) | Impact strength at low temperature (kgf · m/m) | Impact strength at high temperature (kgf · m/m) |
|---|---|---|---|---|---|---|---|
| Example 4 | 1.030 | 22.5 | 221 | 344 | 19998 | 3.7 | 33.8 |
| Comparative Example 9 | 1.028 | 22.7 | 205 | 315 | 19556 | 3.2 | 30.5 |
| Comparative Example 10 | 1.037 | 21.2 | 221 | 343 | 19990 | 3.5 | 33.1 |

TABLE 8

|  | Specific gravity (g/ml) | Melt index (g/10 min) | Tensile strength (kgf/cm$^2$) | Flexural strength (kgf/cm$^2$) | Flexural modulus (kgf/cm$^2$) | Impact strength at low temperature (kgf · m/m) | Impact strength at high temperature (kgf · m/m) |
|---|---|---|---|---|---|---|---|
| Example 5 | 1.019 | 29.2 | 171 | 236 | 13489 | 8.8 | 54.1 |
| Comparative Example 11 | 1.022 | 26.5 | 170 | 235 | 13477 | 8.3 | 53.1 |

In Tables 4 to 8 above, the Examples and the Comparative Examples are correspondingly summarized, in which the type of the olefin-based copolymer was changed but the composition formulation was the same.

As described above, the polypropylene-based composite material of Comparative Example 3 was intended to prepare by using Comparative Preparation Example 5 having a very low melt index of 0.95 g/10 min, processability was very inferior, and successful preparation of a polypropylene-based composite material was difficult, because a copolymer having a very low melt index was used.

Meanwhile, as shown in the Tables, all the polypropylene-based composite materials of the Examples prepared by using the olefin-based copolymers of the Preparation Examples according to the present invention were confirmed to show improved physical properties including the impact strength at low temperature and at high temperature when compared with the Comparative Examples.

As described above, by preparing a polypropylene-based composite material using an olefin-based copolymer satisfying all the conditions defined in the present invention, a polypropylene-based composite material may be easily prepared with excellent processability. Also, it is confirmed that since high impact strength at low temperature and at high temperature is achieved, and processability is excellent, a polypropylene-based composite material applicable to various usages may be prepared.

The invention claimed is:

1. A polypropylene-based composite material comprising polypropylene; and an olefin-based copolymer satisfying the following conditions (a) to (c):

(a) a melt index (MI, 190° C., 2.16 kg load conditions) is 10 to 100 g/10 min, (b) a soluble fraction (SF) at −20° C. measured by cross-fractionation chromatography (CFC) is 0.5 to 10 wt %, where a weight average molecular weight of the soluble fraction (Mw(SF)) is 22,000 or more, and (c) a value of Mw:Mw(SF), which is a ratio of a weight average molecular weight of the olefin-based copolymer (Mw) and the weight average molecular weight of the soluble fraction (Mw(SF), is 0.9:1 to 2:1.

2. The polypropylene-based composite material according to claim 1, wherein the polypropylene is an impact copolymer having a melt index (230° C., 2.16 kg load conditions) of 0.5 to 150 g/10 min.

3. The polypropylene-based composite material according to claim 1, wherein the weight average molecular weight of the olefin-based copolymer is from 10,000 to 100,000 g/mol.

4. The polypropylene-based composite material according to claim 1, wherein the olefin-based copolymer has a molecular weight distribution of 1.5 to 3.0.

5. The polypropylene-based composite material according to claim 1, wherein the polypropylene-based composite material comprises the olefin-based copolymer in 5 to 70 wt %.

6. The polypropylene-based composite material according to claim 1, wherein the olefin-based copolymer is a copolymer of ethylene and an alpha-olefin-based comonomer of 3 to 12 carbon atoms.

7. The polypropylene-based composite material according to claim 1, wherein the polypropylene is propylene-ethylene impact copolymer.

8. The polypropylene-based composite material according to claim 1, wherein the olefin-based copolymer has a density of 0.85 g/cc to 0.89 g/cc measured according to ASTM D-792.

9. The polypropylene-based composite material according to claim 1, wherein the olefin-based copolymer has a hardness (shore A) of 30 to 80.

10. The polypropylene-based composite material according to claim 1, wherein the olefin-based copolymer is a copolymer of ethylene with propylene, ethylene with 1-butene, ethylene with 1-hexene, ethylene with 4-methyl-1-pentene or ethylene with 1-octene.

11. A method for preparing the polypropylene-based composite material of claim 1, the method comprising (S1) a step of preparing polypropylene;

(S2) a step of preparing an olefin-based copolymer comprising polymerizing an olefin-based monomer by injecting hydrogen in 10 to 100 cc/min in the presence of a catalyst composition comprising a transition metal compound represented by the following Formula 1; and (S3) a step of melting and kneading the polypropylene and the olefin-based copolymer:

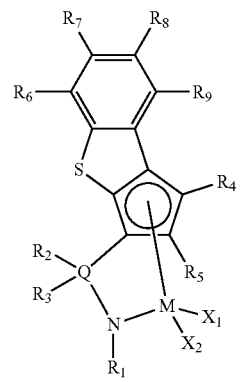

[Formula 1]

in Formula 1, $R_1$ is hydrogen; alkyl of 1 to 20 carbon atoms; alkenyl of 2 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_2$ and $R_3$ are each independently hydrogen; halogen; alkyl of 1 to 20 carbon atoms; alkenyl of 2 to 20 carbon atoms; aryl of 6 to 20 carbon atoms; arylalkyl of 7 to 20 carbon atoms; alkylaryl of 7 to 20 carbon atoms; alkylamido of 1 to 20 carbon atoms; or arylamido of 6 to 20 carbon atoms, $R_4$ to $R_9$ are each independently hydrogen; silyl; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; or a metalloid radical of a metal in group 14, which is substituted with hydrocarbyl of 1 to 20 carbon atoms, adjacent two or more among the $R_2$ to $R_9$ are optionally connected with each other to form a ring, Q is Si; C; N; P; or S, M is a transition metal in group 4, and $X_1$ and $X_2$ are each independently hydrogen; halogen; alkyl of 1 to 20 carbon atoms; alkenyl of 2 to 20 carbon atoms; aryl of 6 to 20 carbon atoms; alkylaryl of 7 to 20 carbon atoms; arylalkyl of 7 to 20 carbon atoms; alkylamino of 1 to 20 carbon atoms; or arylamino of 6 to 20 carbon atoms.

12. The method for preparing the polypropylene-based composite material according to claim 11, wherein $R_1$ is hydrogen; alkyl of 1 to 20 carbon atoms; alkoxy of 1 to 20 carbon atoms; aryl of 6 to 20 carbon atoms; arylalkoxy of 7 to 20 carbon atoms; alkylaryl of 7 to 20 carbon atoms; or arylalkyl of 7 to 20 carbon atoms, $R_2$ and $R_3$ are each independently hydrogen; alkyl of 1 to 20 carbon atoms; aryl of 6 to 20 carbon atoms; or alkylaryl of 6 to 20 carbon atoms, $R_4$ to $R_9$ are each independently hydrogen; alkyl of 1 to 20 carbon atoms; aryl of 6 to 20 carbon atoms; alkylaryl of 7 to 20 carbon atoms; or arylalkyl of 7 to 20 carbon atoms, adjacent two or more among the $R_2$ to $R_9$ are optionally connected with each other to form an aliphatic ring of 5 to 20 carbon atoms or an aromatic ring of 6 to 20 carbon atoms, the aliphatic ring and the aromatic ring are optionally substituted with halogen, alkyl of 1 to 20 carbon atoms, alkenyl of 2 to 20 carbon atoms, or aryl of 6 to 20 carbon atoms, and Q is Si; C; N; or P.

13. The method for preparing the polypropylene-based composite material according to claim 11, wherein
$R_1$ is alkyl of 1 to 20 carbon atoms; aryl of 6 to 20 carbon atoms; arylalkoxy of 7 to 20 carbon atoms; or arylalkyl of 7 to 20 carbon atoms,
$R_2$ and $R_3$ are each independently hydrogen; alkyl of 1 to 20 carbon atoms; or aryl of 6 to 20 carbon atoms,
$R_4$ to $R_9$ are each independently hydrogen; alkyl of 1 to 20 carbon atoms; or aryl of 6 to 20 carbon atoms, and
Q is Si.

14. The method for preparing the polypropylene-based composite material according to claim 11, wherein the transition metal compound represented by Formula 1 is selected from the group consisting of compounds of the following Formula 1-1 to Formula 1-6:

[Formula 1-1]
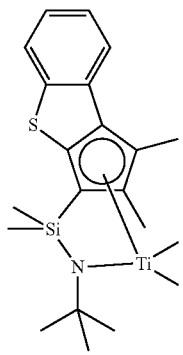

[Formula 1-2]
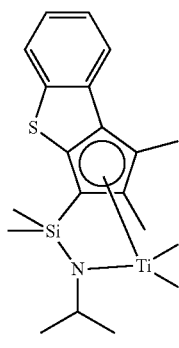

[Formula 1-3]
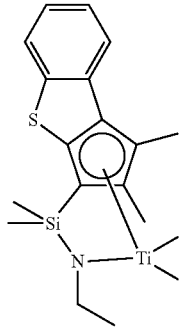

[Formula 1-4]
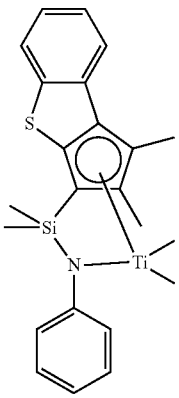

[Formula 1-5]
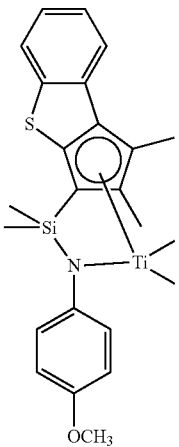

[Formula 1-6]
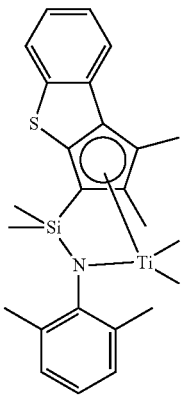

15. The method for preparing the polypropylene-based composite material according to claim 7, wherein the polymerization is carried out at 50 to 200° C.

* * * * *